US012239978B2

(12) United States Patent
Harding et al.

(10) Patent No.: US 12,239,978 B2
(45) Date of Patent: Mar. 4, 2025

(54) SAMPLE PREPARATION SYSTEM

(71) Applicant: TTP Plc, Royston (GB)

(72) Inventors: Piers Sebastian Harding, Royston (GB); Gary Keith Jepps, Royston (GB)

(73) Assignee: TTP Plc, Royston (GB)

( * ) Notice: Subject to any disclaimer, the term of this patent is extended or adjusted under 35 U.S.C. 154(b) by 551 days.

(21) Appl. No.: 17/118,861

(22) Filed: Dec. 11, 2020

(65) Prior Publication Data

US 2021/0178388 A1 Jun. 17, 2021

(30) Foreign Application Priority Data

Dec. 12, 2019 (EP) .................................... 19215703

(51) Int. Cl.
*B01L 3/02* (2006.01)
*B01L 3/00* (2006.01)

(52) U.S. Cl.
CPC ......... *B01L 3/502715* (2013.01); *B01L 3/021* (2013.01); *B01L 2200/0668* (2013.01); *B01L 2400/0406* (2013.01); *B01L 2400/043* (2013.01)

(58) Field of Classification Search
CPC ..................... B01L 3/502715; B01L 2400/043
USPC .......................................................... 209/562
See application file for complete search history.

(56) References Cited

U.S. PATENT DOCUMENTS 5,897,783 A * 4/1999 Howe ..................... B03C 1/288 436/526
6,579,453 B1 * 6/2003 Bachler ................... B03C 1/288 209/222
2005/0271550 A1 12/2005 Talmer et al.
2009/0189464 A1 7/2009 Schilffarth
2010/0284864 A1 * 11/2010 Holenstein ................ B03C 1/01 210/695
2016/0116386 A1 4/2016 Puig
2016/0180998 A1 6/2016 Kanai et al.
2019/0239975 A1 * 8/2019 Bernet ................... A61B 50/30
2019/0270086 A1 * 9/2019 Harding ............. G01N 35/0098

FOREIGN PATENT DOCUMENTS

DE 10063984 A1 * 6/2002 ............ B03C 1/288
WO 9205443 A1 4/1992

OTHER PUBLICATIONS

EP Application No. 19215703; European Examination Report dated Mar. 24, 2020.

* cited by examiner

*Primary Examiner* — Michael McCullough
*Assistant Examiner* — Molly K Devine
(74) *Attorney, Agent, or Firm* — Erise IP, P.A.

(57) ABSTRACT

There is provided a sample preparation device comprising a sample preparation vessel and a bead manipulation mechanism for manipulating sample preparation beads in the vessel. The bead manipulation mechanism comprises: one or more magnets arranged to produce a magnetic field for manipulating, in use, one or more beads in the vessel. Each magnet is attached to a support frame by a biasing support arranged to support the magnet in contact against an outer surface of the vessel such that the magnet maintains contact with the vessel during relative movement between the magnets and the vessel.

11 Claims, 5 Drawing Sheets

SAMPLE PREPARATION SYSTEM

RELATED APPLICATION

This application claims priority to European Patent Application 19215703.0, filed Dec. 12, 2019, entitled SAMPLE PREPARATION SYSTEM, the disclosure of which is incorporated herein by reference.

BACKGROUND

In the field of diagnostics there has been a growing need to provide sample preparation devices that can be used in the analysis of a sample from a patient. In particular there has been a growing need for 'point-of-care' diagnostic devices that enable a sample to be analysed at the location of a patient to ensure rapid analysis and to improve overall care for the patient.

The point-of-care diagnostics market has been growing for several years with the ultimate goal of fulfilling the promise of personalised medicine, and providing the right therapy at the right time for the right patient. Many analytical approaches can be applied to samples, such as molecular diagnostics, chemical analysis, immunoassays and flow cytometry. Whatever the analytical approach, there is a need to be able to supply the sample to the analytical device in a safe and reliable manner. There is furthermore a need to provide a sample preparation cartridge which is small in size and weight, as well as being easy to manufacture and of low cost.

One analytical approach which is desired to be implemented in such a point-of-care device is magnetic elution. Magnetic elution is a technique in which a target substance, such as an antibody, is extracted from a sample fluid.

Some of the analytical techniques used in such sample preparation systems involve the use of magnetic beads for elution of sample fluids in a sample analysis vessel. Magnetic beads, having the capability to bind to a target substance (e.g. proteins, lipids, DNA, RNA), are introduced into the sample fluid in the vessel. As the vessel is incubated, the desired target substance binds to the magnetic beads. The magnetic beads can then be manipulated using magnets external to the vessel, to separate the target substance from the solvent fluid. Whilst theoretically this approach can allow the target substance to be separated from the solvent, in practice it is difficult to capture all of the magnetic beads in the vessel after elution. Furthermore, sample fluid can become trapped between the magnetic beads leading to low capture efficiency.

As a result, current systems have low capture efficiencies and produce low concentrations of the eluent.

The present invention seeks to mitigate or address at least some of the above problems.

SUMMARY OF THE INVENTION

According to an aspect there is provided a sample preparation device comprising a sample preparation vessel and a bead manipulation mechanism for manipulating sample preparation beads in the vessel, the bead manipulation mechanism comprising: one or more magnets arranged to produce a magnetic field for manipulating, in use, one or more beads in the vessel, wherein each magnet is attached to a support frame by a biasing support arranged to support the magnet in contact against an outer surface of the vessel such that the magnet maintains contact with the vessel during relative movement between the magnets and the vessel.

By having magnets attached to a support frame by a biasing support, it is possible to provide magnets which can maintain close contact to the vessel even during relative movement of the magnets with respect to the vessel. As a result, the magnets can be moved relative to the vessel whilst ensuring the required proximity to ensure effective engagement of the resulting magnetic field with the magnetic beads in the vessel. Furthermore, by having magnets attached to the support frame the magnets can be moved in relation to the vessel with a single motion of the support frame. The relative motion in this respect may be a motion along the longitudinal axis of the vessel, or it may be a motion along the longitudinal axis of the support frame, or both. The device may be modular and, in particular, the bead manipulation mechanism may itself be a standalone device configured for use with a reaction vessel.

Preferably each magnet is provided with its own biasing support, such that each magnet of the one or more magnets is attached to the support frame by a respective biasing support. In examples comprising two or more magnets, each biasing support may be arranged to support the respective magnet in contact against an outer surface of the vessel such that the respective magnet maintains contact with the vessel during relative movement between the respective magnet and the vessel (e.g. as the magnets slide across the surface of the vessel). Thus there may be provided a plurality of magnets attached to the support frame and biased against the vessel by a corresponding plurality of biasing supports.

The biasing support or biasing supports may take any form required to provide the necessary resilient force for keeping the magnets in contact with the vessel even when the magnets are moved relative to the vessel. Each biasing support may provide the bias by means of an elastic material, a coil, a spring, or simply by the resilience of a non-elastic material to an equilibrium state. Generally, each biasing support may be laterally flexible. Each biasing support may be biased towards a central axis of the vessel. Preferably, each biasing support may be biased towards a central longitudinal axis of the vessel. Such a support or supports allows the system to have symmetry about the longitudinal axis of the vessel and allows magnets to be positioned about the vessel in a simple and cost-effective manner.

Typically, each of the one or more magnets may be attached to a single support frame. The bead manipulation mechanism may further comprise a driving member arranged to cause, in use, movement of the support frame relative to the vessel. When all of the magnets are connected to a single support frame, a driving member can effect movement of all of the magnets in the device by a single movement of the support frame. This reduces the number of moving components required and increases energy efficiency, whilst simplifying the design. The driving member may be arranged to cause movement of any kind to the support frame and magnets. Typically the driving member may be arranged to cause vertical movement along a central longitudinal axis of the vessel.

The bead manipulation mechanism may comprise any plurality of magnets positioned at various different orientations with respect to the support frame, and, in use, the vessel. Typically, the bead manipulation mechanism comprises two magnets, positioned in use at laterally opposing sides of the vessel. The lateral direction may be a direction perpendicular to the longitudinal axis of the vessel, or a direction perpendicular to the longitudinal axis of the support frame, or a direction perpendicular to the direction of movement of the bead manipulation mechanism in use. By having magnets arranged to be at laterally opposing sides of the vessel it is possible to provide a symmetrical distribution of magnetic field through the cross section of the vessel. Furthermore it is possible to even out the contact forces of the magnets against the vessel (due to the resilient bias force of the biasing support), as force is applied from opposite sides of the vessel. Symmetry may be maintained using any number of magnets, by configuring the magnets in a particular cross-sectional arrangement. For example, the manipulation mechanism may comprise three magnets arranged as a triangular distribution through the plane of the vessel's cross section. In another example the manipulation mechanism may comprise four magnets arranged in two opposing pairs around the cross-section of the vessel. Of course, in other examples, the magnets may be configured to be in a non-symmetric arrangement about the cross-section of the vessel. This may be useful for example if a particular directionality is preferred—i.e. if a magnetic bias in one lateral direction is preferred. Alternatively, a preferred magnetic directionality may also be implemented in a symmetric arrangement by using magnets of different strengths. As discussed above, in each of these examples the plurality of magnets (i.e. the two or more magnets) may be maintained in contact with the vessel by a corresponding plurality of biasing supports. Each magnet may be attached to the support from by a respective biasing support, each biasing support being arranged to support the respective magnet in contact against an outer surface of the vessel such that the respective magnet maintains contact with the vessel during relative movement between the respective magnet and the vessel.

Whilst the vessel may take any form suitable for containing a sample and magnetic beads, typically the vessel may comprise a top end having an aperture and a bottom end. The bottom end may typically be closed or sealed and impermeable to fluid diffusion. The vessel may be substantially conical, or frustoconical. Typically, such conical or frustoconical vessels may comprise a tapered surface at a bottom end. A tapered bottom end may allow particles and/or fluids of higher density to settle in a concentrated area at the bottom of the vessel. In particular, the tapered bottom end of the vessel may allow magnetic beads and eluent to gather in a concentrated area at the bottom of the vessel. The tapered surface may be straight edge tapers or curved tapers.

When the vessel has one or more tapered surfaces, the magnetic beads may be arranged to engage the vessel along the tapered surface(s) of the vessel. In particular, the vessel may have a conical bottom end, with a tapered conical incline leading to a vertex. The beads may engage the vessel along the tapered surface of the vessel so as to 'slide' along the surface when the magnets are made to move in relation to the vessel. When the vessel has a conical bottom end, with a tapered incline (or slope) connecting the non-tapered region to a vertex, the magnets may be arranged to move along the inclined surface between the non-tapered region to the vertex, and vice-versa. Movement of the magnets along the tapered surface may cause the lateral separation of the magnets to vary: in particular, in the case of a conical bottom end the magnets may become closer together as they move down the taper (i.e. towards the vertex).

The driving member may be operable to drive the support frame to a first configuration in which the magnets are at a bottom end of the vessel, and the driving member may be further operable to drive the support frame to a second configuration in which the magnets are at a top end of the vessel. Alternatively, in the second configuration the magnets may be at a position between the top end and bottom end of the vessel. For example, in the second configuration the magnets may be at an end of a tapered surface of the bottom end, which may not necessarily be the same as the top end of the vessel.

The driving member may be further operable to a third configuration wherein the magnets are at a position along the length of the vessel. Alternatively, in the third configuration the magnets may be disengaged from the vessel—i.e. the magnets are not in contact with the vessel. The driving member may be reversibly operable from the first, second or third configuration to any other configuration.

In at least one of the driving member configurations, the magnets may be positioned and arranged such that the resulting magnetic field attracts the magnetic beads in the vessel to the bottom of the vessel. Typically, in the first configuration, the magnets may be arranged such that the resulting magnetic field attracts magnetic beads in the vessel to the bottom of the vessel. By having a configuration in which the beads are attracted and gathered at the bottom of the vessel, magnetic beads can be concentrated at the bottom of the vessel to provide a concentrated eluent. In such a case the beads and eluent are gathered at the bottom so as to have a low tide mark, with a low elution volume. Such effects lead to a significantly increased concentration of the eluent particularly when compared to conventional systems.

In at least one of the driving member configurations, the magnets may be positioned at a side wall of the vessel. When the magnets are at a side wall, the magnets may be positioned, longitudinally speaking, between a top end and a bottom end of the vessel. Typically, in the second configuration, the magnets may be arranged such that the resulting magnetic field attracts magnetic beads to a side wall of the vessel. The magnets may be arranged so as to attract the beads to opposing sides of the vessel.

Of course, the magnets may be arranged to have any of the above mentioned configurations without a driving member, simply by arranging the support frame for example in a suitable position.

According to another aspect there is provided a method for manipulating magnetic beads inside a sample preparation vessel, the method comprising the steps of: providing a bead manipulation mechanism comprising one or more magnets arranged to produce a magnetic field for manipulating, in use, one or more beads in the vessel, wherein each magnet is attached to a support frame by a biasing support, the biasing support arranged to bias the magnets toward the vessel; moving the support frame with respect to the vessel so as to cause relative movement of the one or more magnets with respect to the vessel, wherein the support frame is moved with respect to the vessel such that the magnets maintain contact with the vessel due to the bias provided by the biasing support.

As it will be appreciated, the method of this further aspect may of course use or implement any combination of features of the first aspect as set out above and apply these features as steps in the method.

According to another aspect there is provided a sample preparation device, incorporating any combination of features of the first aspect as set out above, wherein the vessel comprises a fixed section of a pipette component; the device further comprising a moveable pipette arm comprising a pipette tip, the pipette arm being configured, in use, to be moved between a position in which the pipette tip is in sealed engagement with the fixed section of the pipette component and a position in which the pipette tip is positioned away from the fixed section.

The device may further comprise one or more additional vessels, wherein at least one additional vessel comprises a fixed section of a pipette component and the pipette arm may be further configured, in use, to be moved between adjacent vessels to engage the pipette tip with the fixed section of pipette component of the vessels.

The vessels may be arranged around a central axis of a housing and the moveable pipette arm may be arranged to rotate around the axis and lower towards, or raise from, a desired vessel when it has been rotated to be above the desired vessel in use.

BRIEF DESCRIPTION OF THE DRAWINGS

An example sample preparation device will now be described by way of example with reference to the accompanying drawings, in which.

DETAILED DESCRIPTION

Figure 1:
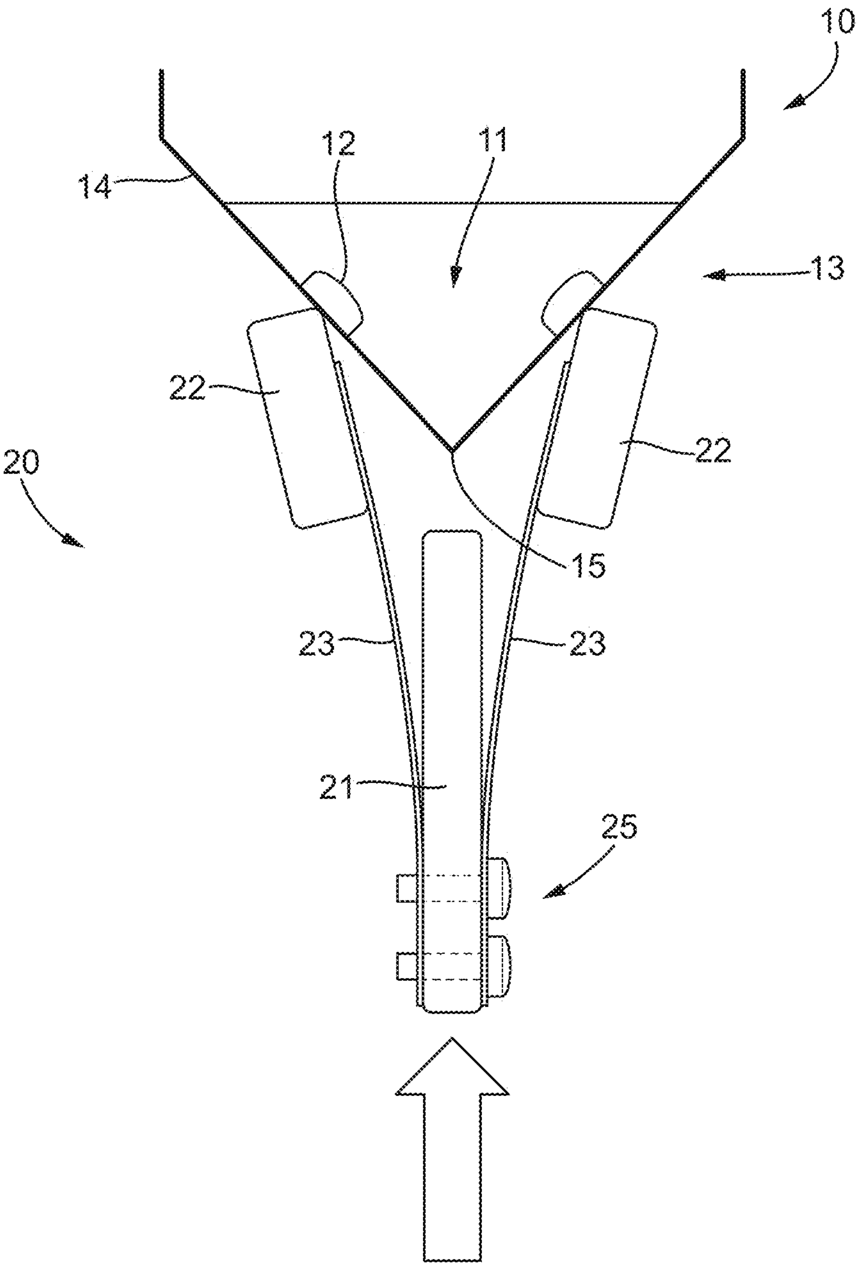
FIG. 1 schematically illustrates an example sample preparation device in one example configuration.

An example sample preparation device 1 is generally illustrated in an assembled configuration in FIG. 1. The example device comprises a sample preparation vessel 10 and a bead manipulation mechanism 20.

The vessel 10 contains a sample fluid 11 to be analysed. The sample fluid 11 generally comprises a target substance in a solvent. In the context of elution techniques and related fields, the target substance and solvent are sometimes referred to as eluate and eluent respectively. The target substance is a substance which is contained or suspended in the solvent and which is desired to be isolated from the solvent. Generally, the target substance is a complex molecule such as a protein or nucleic acid (e.g. DNA, RNA), but can be any substance desired to be extracted or isolated from a solvent. Whilst in this example the fluid 11 is depicted as a liquid, the device and related techniques are equally applicable to gas samples.

Figure 3:
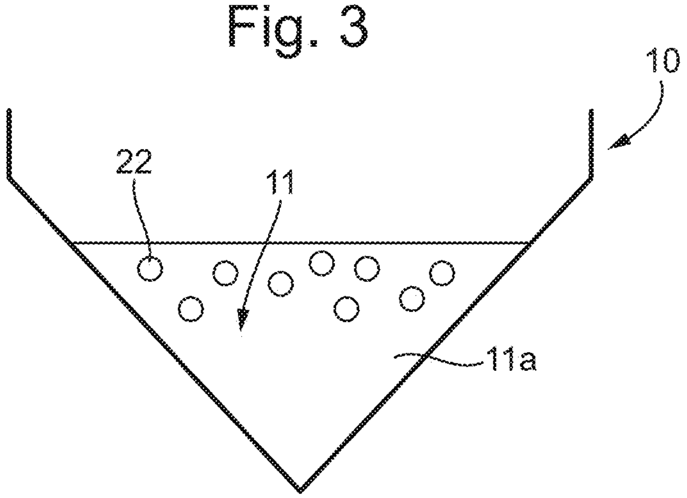
FIG. 3 schematically illustrates an example device in one example configuration.

A plurality of sample preparation beads 12 are contained within the vessel 10. In the example shown in FIG. 1 the beads 12 are arranged inside the vessel so as to be submerged in the fluid 11. The beads 12 are magnetic beads, meaning that they respond when brought into proximity of a magnetic field. In particular, the beads 12 respond to magnetic fields by moving in accordance with the generated magnetic field lines. In this example, the magnetic beads are arranged so as to be attracted by magnets on the bead manipulation mechanism 20 (described in detail below). FIG. 3 schematically illustrates the vessel 10 in use, containing the sample preparation beads 12 within a sample fluid 11. The fluid 11 comprises the desired target substance 11*a* in a solvent. The vessel 10 is shown in FIG. 3 in an 'off' state, where no magnetic field is applied to the inner volume of the vessel. This can be achieved for example by moving the magnets 22 away from the vessel 10 or by switching off the magnets 22 in the case of electromagnets.

The magnetic beads 12 are generally adapted to capture the target substance contained in the fluid 11. In some examples, the beads 12 are adapted to bind the target substance on their surface. In other examples, the beads 12 are adapted to bind the target substance within their inner volumes, i.e. by providing a porous region or cavity within each bead. In this example, each one of the beads 12 comprises one or more binding receptors disposed on its surface. The binding receptors are arranged to specifically bind to the target substance, for example by having a complementary shape or chemical structure to receive and bind at least a part of the target substance. One or more molecules of the target substance can then be effectively captured on the surface of each magnetic bead 12. As it will be appreciated, in other examples the magnetic beads 12 can have alternative adaptations to allow them to bind to or capture the target substance.

The vessel 10 shown in the example is a container having a bottom end 13. The bottom end 13 is depicted in FIG. 1 as being tapered conically from the side surface 14 to a vertex 15. The taper is a straight edge taper. As well as illustrating the advantage of having such a conically tapered bottom end 13, the example provides a simple view of how the present device operates. Other shapes for the bottom end 13 are also possible—one notable alternative is a rounded bottom end 13 which are similar to the closed bottom ends of laboratory test tubes. Of course, in other example vessels 10 the bottom end 13 may be tapered differently, or may omit the taper entirely or partially.

The bead manipulation mechanism 20 illustrated in FIG. 1 comprises a plurality of magnets 22 attached to a support rod 21. Each magnet 22 is attached to the rod 21 by means of a respective flexible biasing support 23. Thus, as shown in FIG. 1, each magnet 22 is attached to the support rod 21 by its own biasing support 23.

Whilst FIG. 1 illustrates, for simplicity, a cross-sectional view of the mechanism 20 depicting two magnets 22 disposed on laterally opposing sides, it will be appreciated that the mechanism 20 may comprise further magnets outside the plane of the cross-section. For example, the mechanism 20 may comprise a further pair of magnets 22 on laterally opposing sides in the plane perpendicular to the plane of the cross-section (i.e. the plane of FIG. 1). The magnets 22 can be permanent magnets, temporary magnets or electromagnets. The strength of the magnets 22 should be such that the beads 12 can be attracted (or repulsed) to a desired region in the vessel 10 without causing destruction or loss.

The support rod is generally rigid and provides structural support for the biasing supports 23 and magnets 22. The biasing supports 23 in this example are secured to the rod 21 by securing means 25. In other examples, the biasing supports 23 can be attached to the rod 21 by adhesive or other attachment means. In yet other examples the biasing supports 23 can be integral with the rod 21—i.e. built as a single continuation of the rod material.

The biasing supports 23 are arranged to have a preferential configuration and to have a restoring force which acts to bias the supports 23 in the direction of the preferential configuration. In the example shown, each biasing support 23 has a preferred orientation in which the longitudinal axis of each biasing support 23 is parallel to the axis of the support rod 21. In other words, the biasing supports 23 are arranged with a restoring action (or force) which biases the supports 23 towards alignment with the support rod 21. In other examples, the biasing supports 23 are biased with a restoring action toward alignment with an axis (e.g. central longitudinal axis) of the vessel 10. Whilst the biasing supports 23 can be arranged to prefer any suitable configuration, generally the biasing supports 23 are biased to have a restoring action in the direction of the vessel 10. The purpose of the biasing supports 23 is to support the magnets against the vessel 10. That is, the biasing supports 23 are arranged to provide structure so as to provide a biasing (or restoring) action so as to maintain contact with the magnets 22 against the outer surface of the vessel 10. In other words, each magnet 22 is maintained in contact with the vessel 10 during relative movement between the magnet 22 and the vessel 10 by the corresponding or respective biasing support 23.

Figure 2:
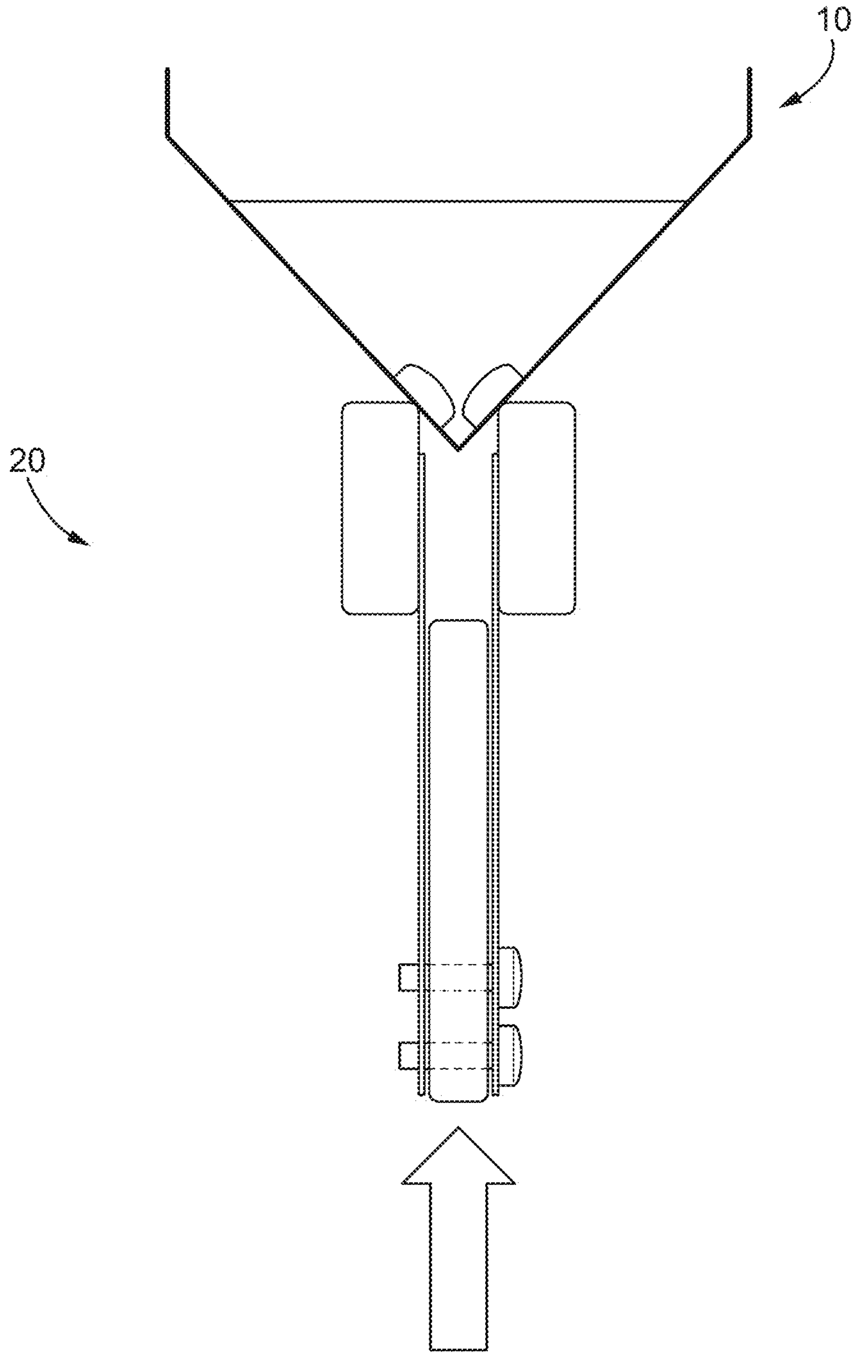
FIG. 2 schematically illustrates an example sample preparation device in another example configuration.

The biasing supports 23 support the magnets 22 against the outer surface of the vessel 10 such that, when the mechanism is moved in relation to the vessel 10, the magnets 22 maintain contact against the vessel 10 surface. FIG. 2 shows the mechanism 20 in a configuration where the support rod 21 has been moved to a position in which the magnets 22 are at a vertex 15 of the tapered bottom end 13 of the vessel 10. It can be seen that, due to the resilience of the biasing supports 23, the magnets 22 are in contact with the surface of the vessel 10. The mechanism 20 can be moved from the configuration of FIG. 2 to the configuration of FIG. 1 by advancing the support rod 21 toward the vessel. The axis of advancement is aligned with the central axis of the vessel 10. It will be appreciated that, due to the resilient biasing action of the biasing supports 23 the magnets 22 slide up the outer surface of the vessel, and maintain contact with the vessel 10 throughout the sliding motion.

In use, the vessel 10 is loaded with a sample to be analysed, along with magnetic beads 12. Normally, the sample is a fluid 11 containing a target substance to be isolated from the rest of the fluid 11. The beads 12 may be loaded into the vessel 10 first and then mixed with the sample. Alternatively the sample may first be loaded into the vessel and then mixed with the beads 12. At this stage, the vessel 10 generally resembles the example illustrated at FIG. 3, where the sample in vessel 10 comprises the beads 12 and target substance distributed within the fluid 11.

The beads 12 are then to be mixed around the sample so that the target substance can bind to the beads 12. This can be achieved by an external mixing method (i.e. by stirring, rotating, sliding, tilting or shaking the vessel 10). Alternatively, the beads 12 can be mixed around the sample by using the magnets 22 of the bead manipulation mechanism 20.

The bead manipulation mechanism 20 is employed by bringing the magnets 22 in proximity to the vessel 10. In one example, the mechanism 20 engages the vessel 10 by advancing the magnets 22 to a bottom end 13 of the vessel 10 (as shown in FIG. 2). In this position, the biasing supports 23 are substantially straight (i.e. not in flexion, and substantially parallel to the support rod 21) and the magnets 22 can attract the beads 12 to the bottom of the vessel 10. In alternative examples, the magnets 22 may not be strong enough to attract all of the magnets present in the vessel 10 to the bottom of the vessel in which case the magnets 22 (and the resulting magnetic field) can be moved around the vessel 10 to bring all the magnetic beads 12 into proximity.

As the bead manipulation mechanism 20 is advanced upwards, the magnets 22 are slid up the surface of the vessel 10 and, due to the tapered bottom end of the vessel 10, the magnets are laterally displaced. Because of this lateral displacement, the biasing supports 23 become laterally displaced at one end causing flexion. The flexion of the biasing supports 23 is counteracted by the resilient restoring force in the supports 23 to maintain the magnets 22 in contact with the vessel 10 surface, whilst allowing the magnets 22 to follow the outer contour of the vessel 10.

As the support rod 21 advances towards the vessel 10, the magnets 22 part from each other to match the outer surface of the vessel 10. This stage is illustrated in FIG. 1. In this state, the magnets 22 are no longer at the bottom vertex 15 of the vessel and are now on the side walls of the vessel 10. The magnets 22 attract the magnetic beads 12 within the vessel to the interior side wall(s) of the vessel 10.

It can thus be seen that by a simple movement of the support rod 21 ‘up’ and ‘down’ with respect to the vessel 10, the mechanism 20 is able to control the position of magnetic beads 12 within the vessel. In particular, the beads 12 can be easily and precisely manipulated from various positions on the side walls of the vessel 10, to the bottom vertex of the vessel 10. One particular advantage of the system described herein is that the beads can be easily and efficiently manipulated, by moving the mechanism 20 to the configuration shown in FIG. 2 for example, to the bottom of the vessel, which results in a low tide mark and a highly concentrated eluent at the bottom of the vessel 10.

Figure 4:
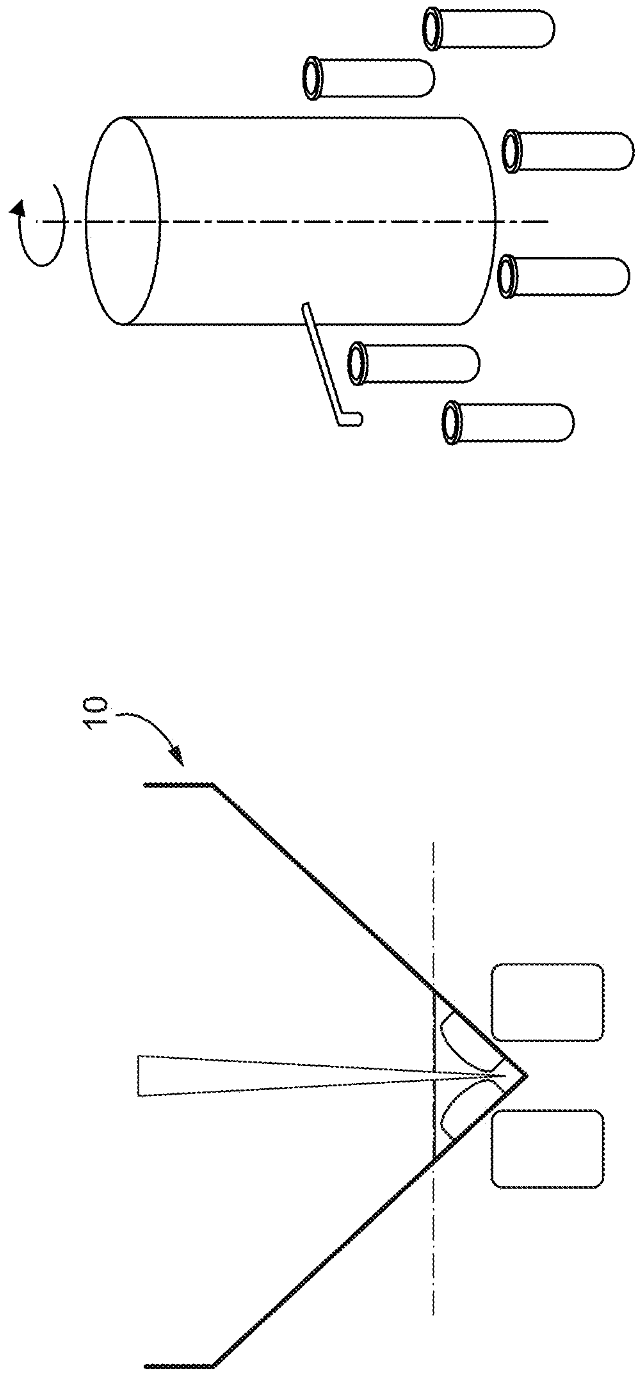
FIG. 4 schematically illustrates an example device in another example configuration.

By moving the mechanism 20 into a configuration in which the magnets 22 are at the bottom of the vessel, the magnets beads 12 in the vessel can be gathered into a ‘clump’ at the bottom inner surface of the vessel 10. This configuration can be seen in FIG. 4. With most or all of the magnets gathered in one location, the sample fluid (solvent) can be aspirated out of the vessel 10 so as to leave the magnetic beads 12 which are left in place at the bottom surface of the vessel 10. Aspiration can be done by suitable means, for example by a pipette or pipette system 40 provided with the device. The beads 12 may remain at the bottom simply by gravity or surface tension, or the beads 12 may be held in place at the bottom by means of the magnets 22 on the manipulation mechanism 20. As it can be seen from FIG. 4, the present invention allows the beads 12 to be collected in a highly concentrated region with a low tide mark so as to leave a highly concentrated eluate. A further advantage is that, due to the low tide mark, only a relatively small volume of fluid is needed for the elution step, which further increases the concentration of the eluent.

Another useful function of the device is that the bead manipulation mechanism 20 can be moved to move the magnets 22 up the side of the vessel 10 so as to capture the beads 12 and move the clumped magnetic beads 12 up and against a side wall of the vessel 10. By moving the magnetic beads 12 up at a side wall, residue trapped between or within the beads can be drained to the bottom of the chamber where it can be easily and effectively removed (for example by aspiration by pipette).

Figure 5:
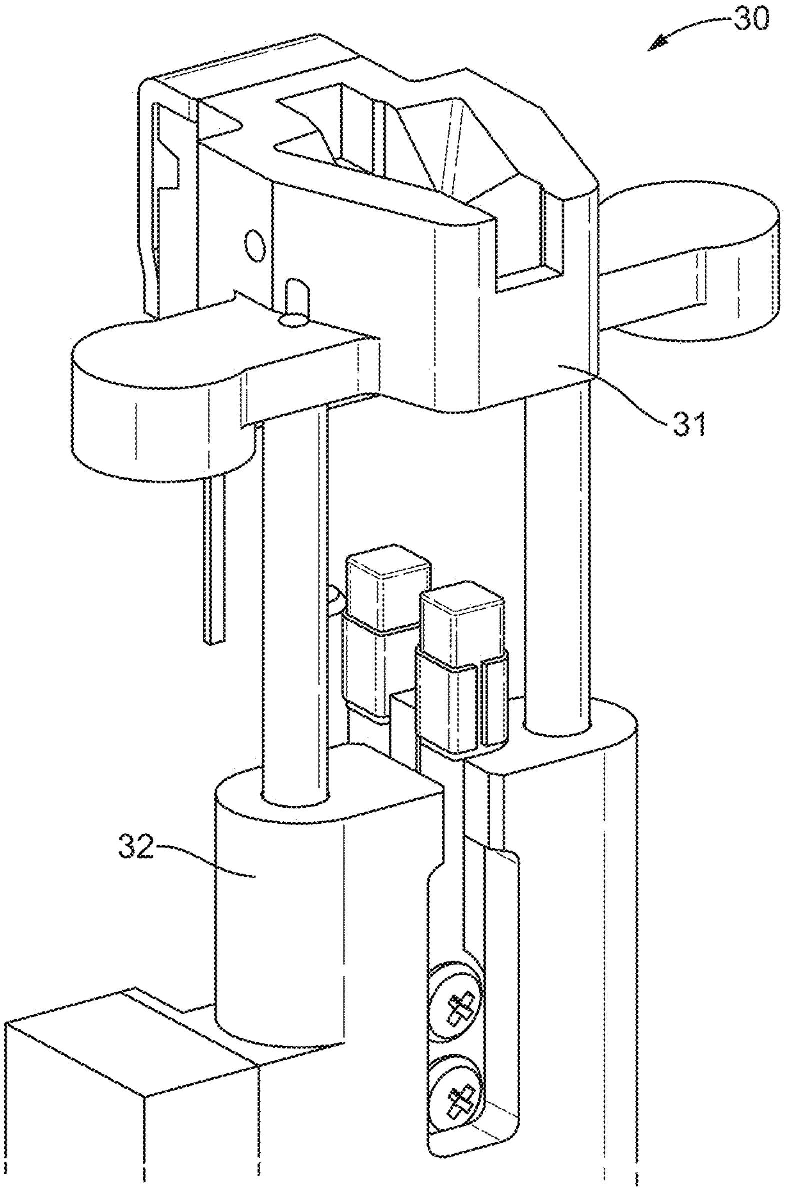
FIG. 5 schematically illustrates an example driving member of an example sample preparation device in one example configuration.

Relative movement of the manipulation mechanism 20 with respect to the vessel 10 can be effected manually or automatically. It will be appreciated that, in order to provide relative movement, the vessel 10 can be moved in relation to the mechanism 20 or the mechanism 20 can be moved in relation to the vessel 10, or both. The system can be configured with a driving member 30, as shown in FIG. 5, to effect the relative movement between the vessel 10 and the bead manipulation mechanism 20. In the example shown the driving member 30 comprises a vessel holder for holding a vessel 10. The driving member 30 also comprises a housing 32 which mounts the bead manipulation mechanism 20. The vessel holder 31 is mounted to the driving member housing 32 by a moveable connection, such that holder 31 can move in relation to the housing 32. This can be achieved for example by a piston mechanism connected to a motor.

In use, a vessel 10 is located in the holder 31. The vessel 10 may be integral with the holder 31 or alternatively the vessel 10 may be built as a standalone component and placed (and secured) into the holder 31. A bead manipulation mechanism 20 as described above is provided in or on the housing 32. The driving member 30 operates by moving the holder 31 in relation to the housing 32 so as to cause relative movement between the vessel 10 and the mechanism 20. The driving member 30 can be programmed to work synchronously with other functions of the sample preparation device. For example, the driving member 30 may co-operate with a pipetting or aspirating device to allow automated or programmed aspiration of the sample fluid.

The bead manipulation mechanism can be utilised in a device comprising a plurality of vessels. In such a case, each vessel may be fitted with a bead manipulation mechanism at the vessel, or alternatively one more or manipulation mechanisms can be configurable between the vessels to provide functionality to more than one vessel in the device. Where the device comprises a pipette tip, the pipette tip may be moveable between the pluralities of vessels. The pipette can be formed of a tip extending from a central axis, around which the vessels are distributed, and a fixed portion positioned at the vessel. The pipette tip may be rotatable about the central axis to engage the fixed potion of each vessel.

As will be appreciated from the above, the present invention, by providing an innovative bead manipulation mechanism which can simply and effectively manipulate beads inside a sample analysis vessel without complex movement, enables the provision of a sample analysis device which is compact, inexpensive and produces a significantly improved ability to provide purified and concentrated target substances without risk of inhibition. Furthermore, due to the efficient and effective manipulation of beads inside the sample the present invention significantly increases the magnetic bead capture rate which speeds up any analysis and testing carried out with the device.

The invention claimed is:

1. A sample preparation device comprising a sample preparation vessel and a bead manipulation mechanism for manipulating one or more magnetic beads in the sample preparation vessel, the bead manipulation mechanism comprising:

two magnets arranged to produce a magnetic field for manipulating, in use, the one or more magnetic beads in the sample preparation vessel, wherein each of the two magnets is attached to a support frame, wherein each magnet is attached to the support frame by a biasing support arranged to support a magnet of the two magnets in contact against an outer surface of the sample preparation vessel such that the magnet maintains contact with the sample preparation vessel during relative movement between the two magnets and the sample preparation vessel, and wherein the two magnets are positioned in use at laterally opposing sides of the sample preparation vessel;

the bead manipulation mechanism further comprising:

a driving member arranged to cause, in use, movement of the support frame relative to the sample preparation vessel, wherein the driving member is arranged to cause relative vertical movement of the support frame along a central longitudinal axis of the sample preparation vessel, wherein the driving member is operable to drive the support frame to a first configuration in which the two magnets are at a bottom vertex of the sample preparation vessel, and the driving member is further operable to drive the support frame to a second configuration in which the two magnets are on side walls of the sample preparation vessel, wherein in the first configuration, the two magnets are arranged such that the resulting magnetic field attracts the one or more magnetic beads in the sample preparation vessel to the bottom vertex of the sample preparation vessel;

the sample preparation device further comprising:

a moveable pipette arm arranged to rotate around a central axis of a central housing of the sample preparation device to position a pipette tip above the sample preparation vessel in use, wherein the moveable pipette arm is arranged to lower towards and raise from the sample preparation vessel in use.

2. A sample preparation device according to claim 1, wherein each biasing support is laterally flexible, and is biased towards the central axis of the sample preparation vessel.

3. A sample preparation device according to claim 1, wherein the sample preparation vessel comprises a top end having an aperture and a bottom end, and wherein the sample preparation vessel is substantially conical, or frustoconical, and comprises a tapered surface at the bottom end.

4. A sample preparation device according to claim 3, wherein the two magnets are arranged to engage the sample preparation vessel along the tapered surface of the sample preparation vessel.

5. A sample preparation device according to claim 3, wherein the side walls are substantially parallel to the central longitudinal axis of the sample preparation vessel and the tapered surface leads to the bottom vertex.

6. A sample preparation device according to claim 1, wherein, in the second configuration, the two magnets are arranged such that the resulting magnetic field attracts the one or more magnetic beads to the side walls of the sample preparation vessel.

7. A sample preparation device according to claim 1, wherein the biasing supports comprise one or more of a spring element and an elastic element.

8. A method for manipulating one or more magnetic beads inside a sample preparation vessel, the method comprising:

providing a bead manipulation mechanism comprising two magnets arranged to produce a magnetic field for manipulating, in use, the one or more magnetic beads in the sample preparation vessel, wherein each magnet of the two magnets is attached to a support frame, wherein each magnet is attached to the support frame by a biasing support, the biasing support arranged to bias the two magnets toward the sample preparation vessel, and wherein the two magnets are positioned in use at laterally opposing sides of the sample preparation vessel;

wherein the bead manipulation mechanism further comprises a driving member arranged to cause, in use, movement of the support frame relative to the sample preparation vessel, wherein the driving member is arranged to cause relative vertical movement of the support frame along a central longitudinal axis of the sample preparation vessel, moving the support frame with respect to the sample preparation vessel along the central longitudinal axis of the sample preparation vessel, so as to cause relative movement of the two magnets with respect to the sample preparation vessel, wherein the support frame is moved with respect to the sample preparation vessel such that the two magnets maintain contact with the sample preparation vessel due to the bias provided by the biasing support, driving the support frame by the driving member to a first configuration in which the two magnets are at a bottom vertex of the sample preparation vessel, and driving the support frame by the driving member to a second configuration in which the two magnets are on side walls of the sample preparation vessel, wherein in the first configuration, the two magnets are arranged such that the resulting magnetic field attracts the one or more magnetic beads in the sample preparation vessel to the bottom vertex of the sample preparation vessel;

providing a moveable pipette arm arranged to rotate around a central axis of a central housing to position a pipette tip above the sample preparation vessel in use; and wherein the moveable pipette arm is arranged to lower towards and raise from the sample preparation vessel in use.

9. A method according to claim 8, wherein the biasing support is laterally flexible and is biased towards the central axis of the sample preparation vessel.

10. A method according to claim 8, wherein the sample preparation vessel comprises a top end having an aperture and a bottom end, and wherein the sample preparation vessel is substantially conical, or frustoconical, and comprises a tapered surface at the bottom end.

11. A method according to claim 10, wherein the side walls are substantially parallel to the central longitudinal axis of the sample preparation vessel and the tapered surface leads to the bottom vertex.

* * * * *